(12) United States Patent
Subramanian et al.

(10) Patent No.: US 11,507,430 B2
(45) Date of Patent: Nov. 22, 2022

(54) ACCELERATED RESOURCE ALLOCATION TECHNIQUES

(71) Applicant: Intel Corporation, Santa Clara, CA (US)

(72) Inventors: Rasika Subramanian, Hillsboro, OR (US); Francesc Guim Bernat, Barcelona (ES); David Zimmerman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 16/144,962

(22) Filed: Sep. 27, 2018

(65) Prior Publication Data

US 2020/0104184 A1   Apr. 2, 2020

(51) Int. Cl.
*G06F 9/50* (2006.01)
*G06F 11/34* (2006.01)
(Continued)

(52) U.S. Cl.
CPC ........ *G06F 9/5044* (2013.01); *G06F 11/3409* (2013.01); *G06N 3/04* (2013.01);
(Continued)

(58) Field of Classification Search
CPC .... G06F 9/5044; G06F 11/3409; G06F 9/505; G06F 9/50; G06N 3/04; G06N 3/08; H04L 41/5003; H04L 47/70
See application file for complete search history.

(56) References Cited

U.S. PATENT DOCUMENTS 11,157,847 B2 * 10/2021 Abhinav ................ G06Q 50/01
2016/0057041 A1 *  2/2016 Gupta ................ H04L 41/5025
                                                                        706/12
(Continued)

FOREIGN PATENT DOCUMENTS

CN           107995039 A      5/2018

OTHER PUBLICATIONS

"6 Dashboards for Managing Every Modern Data Center", Voices of the Industry, https://datacenterfrontier.com/6-dashboards-managing-every-modern-data-center, Feb. 9, 2017, 13 pages.
(Continued)

*Primary Examiner* — Michael A Keller
(74) *Attorney, Agent, or Firm* — Compass IP Law PC

(57) ABSTRACT

Examples described herein can be used to determine and suggest a computing resource allocation for a workload request made from an edge gateway. The computing resource allocation can be suggested using computing resources provided by an edge server cluster. Telemetry data and performance indicators of the workload request can be tracked and used to determine the computing resource allocation. Artificial intelligence (AI) and machine learning (ML) techniques can be used in connection with a neural network to accelerate determinations of suggested computing resource allocations based on hundreds to thousands (or more) of telemetry data in order to suggest a computing resource allocation. Suggestions made can be accepted or rejected by a resource allocation manager for the edge gateway and the edge server cluster.

18 Claims, 7 Drawing Sheets

(51) Int. Cl.
*G06N 3/04* (2006.01)
*G06N 3/08* (2006.01)
*H04L 41/5003* (2022.01)
*H04L 47/70* (2022.01)

(52) U.S. Cl.
CPC ........... *G06N 3/08* (2013.01); *H04L 41/5003* (2013.01); *H04L 47/70* (2013.01)

(56) References Cited

U.S. PATENT DOCUMENTS

| | | | |
|---|---|---|---|
| 2018/0113742 | A1 | 4/2018 | Chung et al. |
| 2018/0167434 | A1* | 6/2018 | Sathyanarayana ........................... H04L 67/2852 |
| 2019/0205735 | A1* | 7/2019 | Smelyanskiy .......... G06F 17/16 |
| 2019/0253742 | A1* | 8/2019 | Garten ............. H04N 21/25891 |
| 2019/0324820 | A1* | 10/2019 | Krishnan ................ G06F 9/505 |
| 2019/0349251 | A1* | 11/2019 | Weldemariam ..... H04L 41/0806 |

OTHER PUBLICATIONS

"Tuning Applications Using a Top-down Microarchitecture Analysis Method", Intel VTUNE Amplifier Documentation, Sep. 7, 2018, 12 pages.

A.I. WIKI, "A Beginner's Guide to Deep Reinforcement Learning" https://skymind.ai/wiki/deep-reinforcement-learning, Sep. 11, 2018, 31 pages.

Http://GitHub-sysstat/sysstat:Performance monitoring tools for Linux, Sep. 20, 2018, 7 pages.

NPL_Whitepapers, "Intel Rack Scale Design Architecture", Data Center, Rack Scale Design, 6 pages.

Willhalm, Thomas, "Intel Performance Counter Monitor—A better way to measure CPU utilization", https://software.intel.com/en-us/articles/intel-performance-counter-monitor, published Aug. 16, 2012, updated Jan. 5, 2017.

Wu, Youfeng, et al., "Impacts of Multiprocessor Configurations on Workloads in Bioinformatics", 19th International Symposium on Computer Architecture and High Performance Computing, 2007 IEEE, pp. 105-113.

Extended European Search Report for Patent Application No. 19182446.2-1221, dated Nov. 19, 2019, 12 pages.

Herman Chan / Voices of the Industry: "6 Dashboards for Managing Every Modem Data Center", Data Center Frontier, Feb. 9, 2017 (Feb. 9, 2017), XP002795337, Retrieved from the Internet: URL:https://datacenterfrontier.com/6-dashboards-managing-every-modern-data-center/ [retrieved on Oct. 28, 2019] the whole document.

European First Office Action for Patent Application No. 19182446.5, dated Jan. 5, 2022, 11 pages. (EP Exam Report Article 94(3) EPC).

\* cited by examiner

ACCELERATED RESOURCE ALLOCATION TECHNIQUES

TECHNICAL FIELD

Various examples are described herein that relate to computer resource assignments.

BACKGROUND

Cloud computing provides a client device with tremendous computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer. For example, low latency requirements may arise from rapid but highly informed decisions needed by autonomous driving vehicles, smart homes, image recognition technologies, voice interface technologies, video surveillance for threat detection, cyber-security, cloud services for mobile devices, industrial machines, or health monitoring system uses.

Edge computing is an emerging paradigm where computers, such as a data center of computing resources, are located physically closer to network access points that are in communication with the client devices. For example, an edge computing data center can be physically close or within the same physical room or building as a communication base stations or network connections in communication with client devices. The communication base stations or network connections can route requests for data processing or data transmission to the edge computing system.

DETAILED DESCRIPTION

Figure 1:
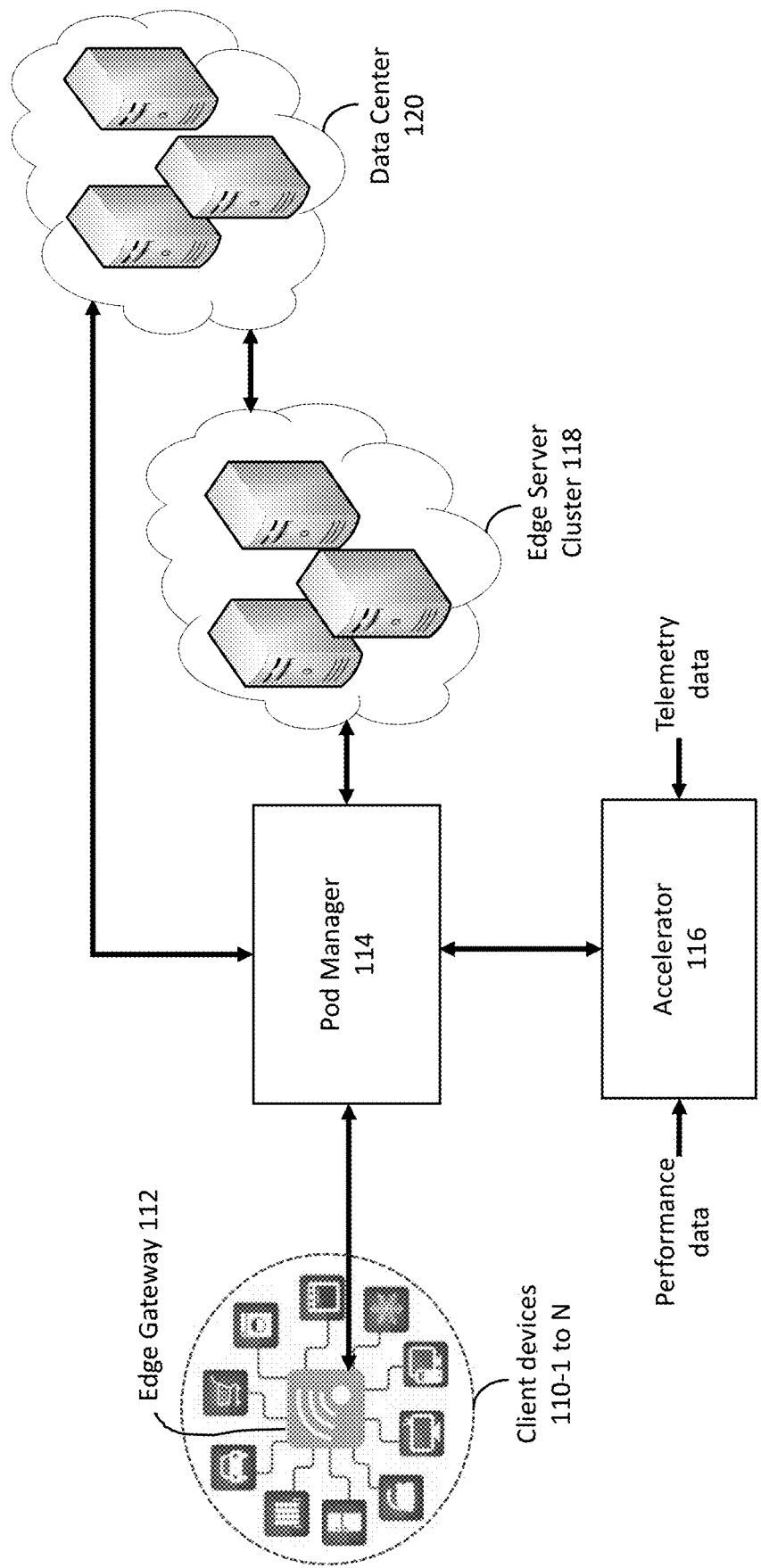
FIG. 1 illustrates an example system, in accordance with an embodiment.

As application processing is being handled in edge and cloud environments, there is a need for scheduling orchestrations using edge or cloud computing resources that are quick as well as smart. Various embodiments can improve application scheduling and deployment as well as application workload resource allocation in the edge and/or cloud computing environments. A pod resource manager provides scheduling orchestration for data centers and edge cloud setups by assigning resources by using a combination of telemetry data, application performance measurements, and one or more accelerators. Workload requests requested to be performed by an edge platform or cloud resources can be sent directly to the pod resource manager. The pod resource manager can provide the request to an accelerator to run the workload request through an Artificial Intelligence (AI) model and so that the AI model suggests a resource configuration for the same. Use of an AI model can allow for smarter and faster resource management and allocation decisions. The AI model does not have to be trained as it will be configured to continuously learn on-the-go using, for example, reinforcement learning that develops based on rewards or penalties from resources it has suggested for use. The accelerator uses a workload table to keep track of the workloads and their boundedness and characteristics. Boundedness can be a representation of an extent that a workload performance utilized (or limited) by one or more of: processor compute, processor frequency, networking bandwidth, memory resources, or storage resources. For example, boundedness for each category of computing resource can be represented as a percentage or boundedness can be represented as a score. The boundedness and key performance indicator (KPI) of each workload can be calculated by the accelerator or other device. For example, the KPI can be considered to be end-to-end latency of a workload (e.g., time from a workload request to completion of the workload by a returned response or result) but can vary depending on the user's requirements. To evaluate the performance of a workload, the accelerator absorbs and processes telemetry data (which can be a very large of information) associated with the workload and resources used by the data center (e.g., edge or cloud) to perform the workload. Some embodiments can use any KPI provided in the following hyperlink:
https://datacenterfrontier.com/6-dashboards-managing-every-modern-data-center/

Various embodiments provide for an accelerated pod resource manager to receive workload requests from one or more client devices. For example, workload requests can be from applications or other software run by one or more client devices made to an edge computing system to perform computations or use or access memory or storage. The edge computing system can be located physically proximate to at least some of the client devices. In addition, or alternatively, the edge computing system can be located physically proximate to the local or wide area network access point(s) or device(s) that provide wireless or wired communications between the client devices and the edge computing system. In some examples, the pod resource manager can leverage AI or machine learning (ML) to determine a computing resource allocation to allocate for a workload request. A reinforcement learning scheme can be used to generate resource allocation suggestions based on positive or negative rewards from prior resource allocation suggestions. When a resource allocation suggestion is applied, its associated KPI is compared to the previous workload run's performance (e.g., KPI) and a reward is calculated and accumulated in a workload table.

FIG. 1 depicts an example system that uses a pod manager and accelerator that leverages AI to recommend a resource configuration to an edge computing system based on workload requests from one or more client devices. Client devices 110-1 to N, where N is an integer greater than 1, can be any type of device that receives information including any device that use one or more of the following capabilities: any type of sensor, camera, or microphone. Client devices 110-1 to N can provide outputs based on interpretation of data using actuation, speakers, displays, holograms, or other user interfaces. For example, any of client devices 110-1 to N can be part of a smart phone, autonomous driving vehicle, image recognition technology, voice interface technology, video surveillance for threat detection, cybersecurity, internet of things (IoT), industrial machines such as a turbine, magnetic resonance system, smart home device, in-home sensor device, smart appliance, and other smart device. Client devices 110-1 to N can leverage computationally powerful edge or cloud-based computation to interpret sensed information but subject to latency requirements or to provide analysis, store, or backup data. Client devices 110-1 to N can communicate with edge gateway 112, directly or indirectly, in order to request computation, storage, data transmission, or other operations by edge server cluster 118 or data center 120.

Client devices 110-1 to N can request use of a resource by submitting a workload request to edge gateway 112. For example, a client device 110-1 can specify in the workload request one or more of the following: the requesting application or process (e.g., social networking application, database, photo editing or creation application, cryptography, to name a few), quality of service (QoS) requirements, and service level agreement (SLA) requirements. In some cases, a workload request can include computing resources requested (e.g., edge server cluster or data center cloud). For example, SLA requirements may include one or more of: application availability (e.g., 99.999% during workdays and 99.9% for evenings or weekends), maximum permitted response times to queries or other invocations, requirements of actual physical location of stored data, or encryption or security requirements.

Edge gateway 112 can be a dedicated or shared physical device or software program (or any combination thereof) that serves as the connection point between client devices 110-1 to N and one or more of edge server cluster 118 or data center 120. Data moving to the cloud, or vice versa, can be routed through edge gateway 112. Edge gateway 112 can submit the workload request to pod manager 114 or modify the request to a format that pod manager 114 recognizes or accepts. Client devices 110-1 to N can address their workload requests to pod manager 114, provide them to edge gateway 112, or provide them to edge server cluster 118 and pod manager 114 intercepts at least some of the requests.

Pod manager 114 requests accelerator 116 to provide suggested resource allocations for a workload request. Pod manager 114 can accept or reject the resource allocation suggestion from accelerator 116. For example, pod manager 114 may reject a resource allocation suggestion if an SLA requirement is not satisfied by the recommendation or reject suggestions made early in training of the AI model. Pod manager 114 allocates computer resources in edge server cluster 118 and/or can allocate resources on data center 120 to perform one or more workloads serially or in parallel.

Pod manager 114 and accelerator 116 can be physically located in a rack in edge server cluster 118 or data center 120. A rack can be a type of physical steel and electronic framework that is designed to house servers, networking devices, cables, and other data center computing equipment. Pod manager 114 and accelerator 116 can be part of a section of racks or multiple storage device clustered together and are in a same section of a data center. Pod manager 114 and accelerator 116 can be located in a same room or building as that of edge server cluster 118 or data center 120. Pod manager 114 and accelerator 116 can communicate with edge server cluster 118 or data center 120 using any type of high speed wired or wireless interconnection techniques such as but not limited to Ethernet or optical communication links. Pod manager 114 can be implemented as any or a combination of: a physical machine with hardware and software components, a virtual machine (VM), or in a container. For edge server cluster 118 and/or data center 120, pod manager 114 can be responsible for managing and allocating resources for a pod of computing elements, e.g., a rack or several interconnected racks and where a rack can include hardware resources, such as compute modules, volatile and non-volatile memory modules, hard disk (HDD) storage modules, field programmable gate array (FPGA) modules, and networking modules. Pods can be linked together using any network topology determined by the data center administrator.

Pod manager 114 and accelerator 116 can be located in the same building, room, or rack as edge gateway 112, edge server cluster 118, and/or data center 120.

Edge server cluster 118 can handle some workloads without passing the workloads to data center 120. Note that data center 120 can be computing resources provided in a single portion of a rack, entire rack, room, or building. Multiple instances of data center 120 can be made available to pod manager 114 and edge server cluster 118. In some examples, data center 120 is located physically further from edge gateway 112 than edge server cluster or a latency of communications between edge gateway 112 and data center 120 are longer than a latency of communications between edge gateway 112 and edge server cluster 118.

Telemetry data and application performance monitoring can be provided to accelerator 116 in or out of band from communications between pod manager 114 and edge gateway 112 or in or out of band from communications between pod manager 114 and edge server cluster 118 or data center 120. For example, telemetry data that can be captured using counters or performance monitoring events related to: processor or core usage statistics, input/output statistics for devices and partitions, memory usage information, storage usage information, bus or interconnect usage information, processor hardware registers that count hardware events such as instructions executed, cache-misses suffered, branches mispredicted. For a workload request that is being performing or has completed, one or more of the following can be collected: telemetry data such as but not limited to outputs from Top-down Micro-Architecture Method (TMAM), execution of the Unix system activity reporter (sar) command, Emon command monitoring tool that can profile application and system performance. However, additional information can be collected such as outputs from a variety of monitoring tools including but not limited to output from use of the Linux perf command, Intel PMU toolkit, Iostat, VTune Amplifier, or monCli or other Intel Benchmark Install and Test Tool (Intel® BITT) Tools. Other telemetry data can be monitored such as, but not limited to, power usage, inter-process communications, and so forth.

Accelerator 116 can use an artificial intelligence (AI) model or models that use a supervised or unsupervised reinforcement learning scheme to guide its suggestions of compute resources. For example, for a workload, the AI model can consider any of measured telemetry data, performance indicators, boundedness, utilized compute resources, or evaluation or monitoring of the application performance (including the application's own evaluation of its performance). A reward or penalty can be provided for each utilized resource suggestion and the AI model can determine subsequent resource configuration settings to increase accumulated rewards.

Accelerator 116 can capture hundreds or more of metrics every millisecond. For example, there may be thousands of servers in a cluster and in some cases, many of the servers provide telemetry data related to performance of a particular workload. Pod manager 114 may also be responsible for resource allocations for multitudes of workloads that run in parallel. An application can also provide evaluation of performance of its workload using applied resources or other source(s) can evaluate performance of the workload and provide the evaluation. At least because of potentially massive amount of telemetry information received, a hardware-based accelerator (e.g., a neural network, convolutional neural network, or other type of neural network) can be used to accelerate suggestions for resource allocations based on the telemetry data.

Using an AI model that determines resource configurations based on received workload requests in near real-time by processing potentially massive amounts of telemetry data can increase latency between a workload request and the completion of the workload request. Extracting AI modelling (and its training) and ingestion of telemetry data using an accelerator can reduce the latency by allowing for suggestions of resource allocations for multiple workload requests in parallel while leveraging AI models.

Figure 2:
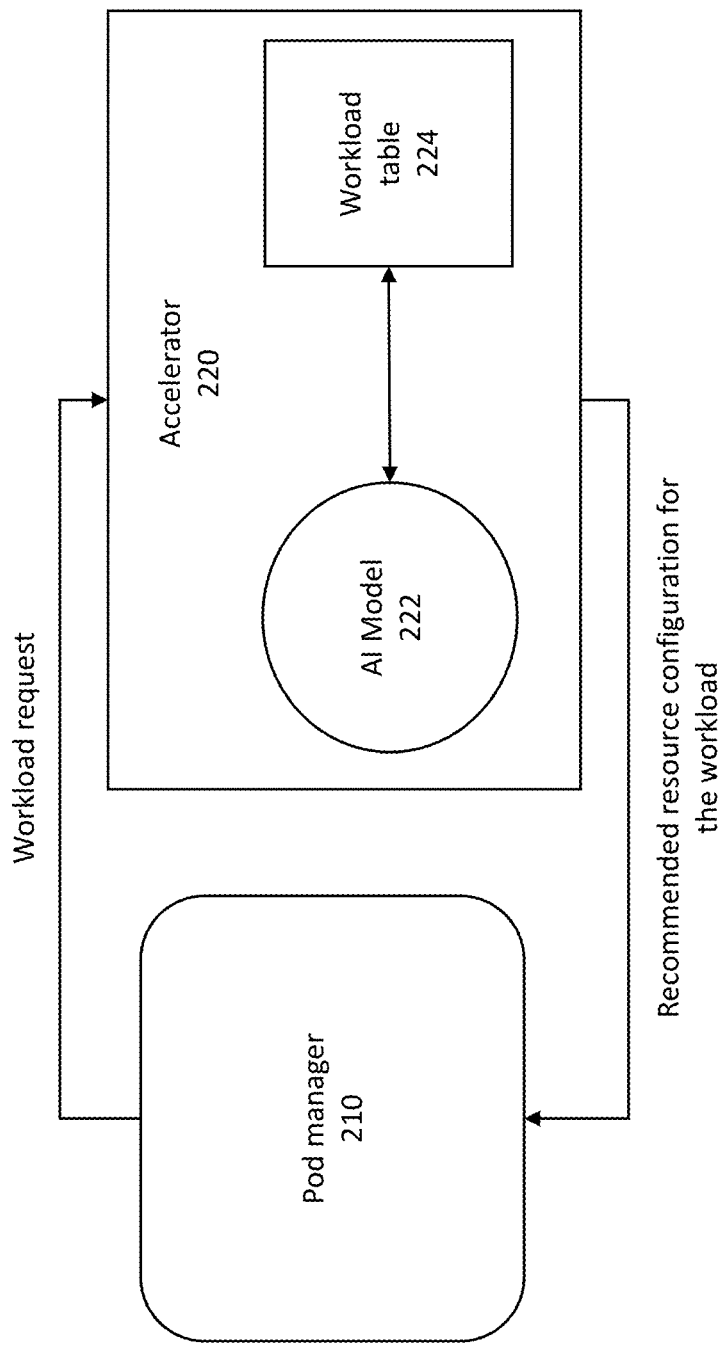
FIG. 2 depicts an example system that can be used to recommend a resource configuration for a workload, in accordance with an embodiment.

FIG. 2 depicts an example system that can be used to recommend a resource configuration for a workload. In response to receipt of a workload request from a client device or edge gateway, pod manager 210 provides parameters of the workload request to accelerator 220. Accelerator 220 provides to AI model 222 the workload parameters from pod manager 210 and also information related to the workload from workload table 224. Workload table 224 keeps track of previously performed workloads and their characteristics such as one or more of: boundedness (e.g., utilization of one or more of: processor, memory, network, storage, or cache), applied resource allocations, telemetry data, or workload performance characteristic(s). AI model 222 runs its inference model and produces a predicted best or recommended resource configuration for that workload. AI model 222 does not have to be trained prior to providing resource configuration recommendations as it will be configured to continuously learn on-the-fly using a reinforcement learning scheme. Pod manager 210 can choose to accept or reject the recommended resource configuration. For example, if an SLA requirement is not satisfied by the recommendation, pod manager 210 may reject the recommendation. For suggestions made early in training of AI model 222, pod manager 210 may reject the recommendations. For example, the first X recommendations may be rejected, where X is 1 or more.

AI model 222 keeps evolving and learning as it progressively receives different inputs. Reinforcement learning can be a goal-oriented scheme that learns how to attain a complex objective (goal) or maximize along a particular dimension over many steps. Reinforcement learning can attempt to solve a problem of correlating immediate actions with the delayed returns they produce. AI model 222 is rewarded when its recommendation yields performance requirements being met or exceeded, whereas AI model 222 is penalized or not rewarded when it recommends that degrades performance or does not meet performance requirements. Reinforcement learning provides for AI model 222 to run through sequences of state-action pairs, observe the rewards that result from the recommendation, and adapt the recommendations to maximize or increase accumulated rewards.

By contrast, using a static look-up-table that matches a configuration with a workload may provide an inadequate resource configuration. The static look-up-table can fail to account for changes in the data center ecosystem or can provide for inefficient data center utilization that does not allow the resources to be shared over as many workloads as can be. A static configuration might not currently meet workload performance requirements or may utilize computing resources in an inefficient manner. Performance can change due to software stack changes, new or different concurrently running or scheduled workloads, hardware modifications, network capacity changes (increases or decreases), memory changes (increases or decreases), or storage changes (increases or decreases).

Figure 3:
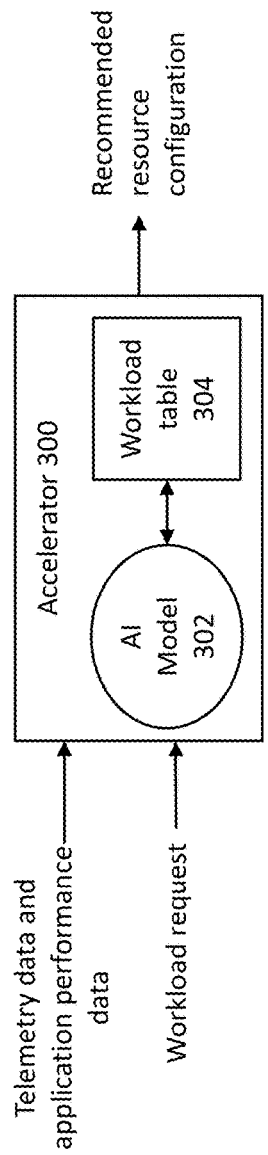
FIG. 3 depicts an accelerator, in accordance with an embodiment.
Figure 4:
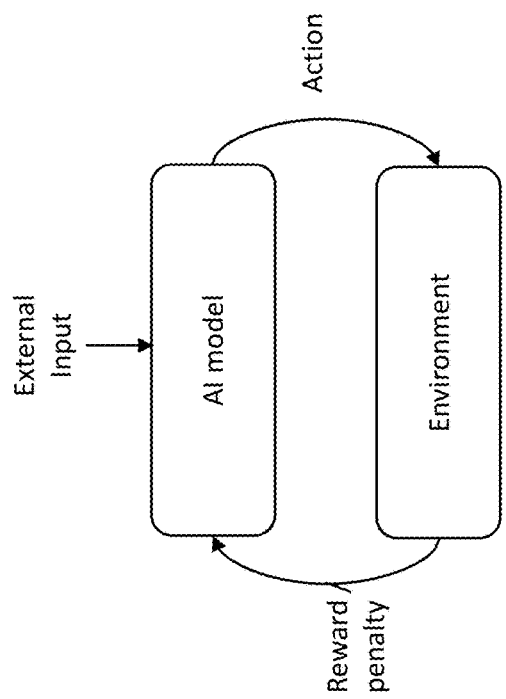
FIG. 4 illustrates an example feedback process using reinforcement learning, in accordance with an embodiment.

FIG. 3 shows, in block diagram format, an accelerator. Accelerator 300 feeds the AI model 302 with workload request data from the pod manager and information related to the workload request from workload table 304 as well as telemetry data and application workload performance data, and AI model 302 runs its inference and provides a recommended resource configuration for that workload based on prior rewards or penalties and accumulated rewards. As illustrated in FIG. 4, as an external input is fed into the AI model, the AI model performs inference on the input and takes an action, depending on the impact of that action, and this action is then rewarded positively or negatively. This reward/penalty system helps the model to "learn on the go."

Figure 5:
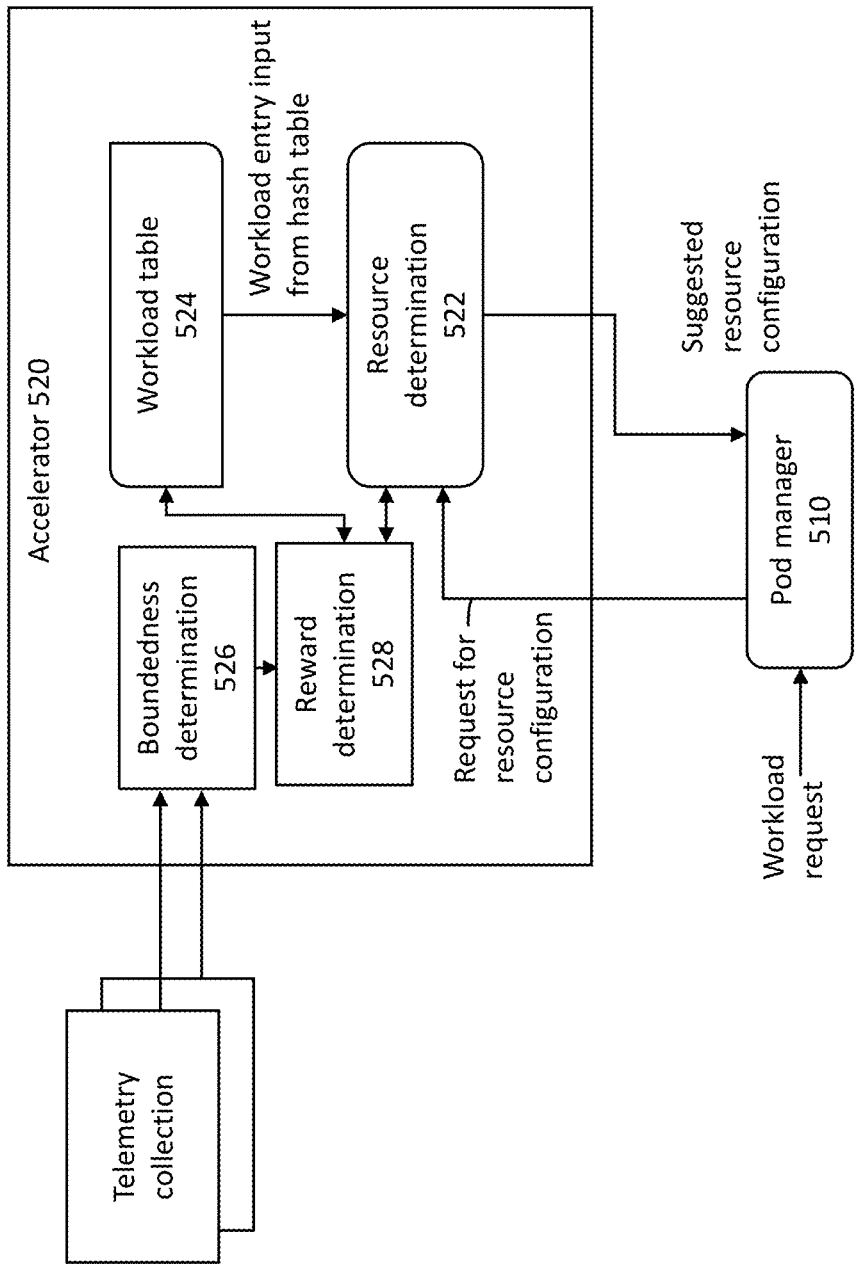
FIG. 5 provides an example system, in accordance with an embodiment.

FIG. 5 illustrates an example system 500 in block diagram format. In response to pod manager 510 receiving a workload request from an application or client device routed through the edge gateway or the edge gateway itself, pod manager 510 provides workload request data to the accelerator. For example, a workload request may include one or more of the following: (a) an application identified by a binary identifier value of N bits in length, where N is greater than or equal to 1 and (b) one or more performance requirements as an SLA requirement(s). Pod manager 510 can make a request for a resource configuration to accelerator 520, where the request can include the received workload request or a portion of the content in the received workload request.

In some examples, pod manager 510 can set one or more resource parameters in the request for resource configuration so that accelerator 520 determines other resource parameters to satisfy the SLA for the application. For example, if pod manager 510 specifies a network bandwidth parameter for the workload request of for example, 500 Mbps, accelerator 520 can choose other resource parameters (e.g., compute resources, storage, and so forth). In some examples, pod manager 510 can specify target KPIs or other requirements for the workload request that accelerator 520 will use in place of or in addition to requirements specified by its SLA. Such parameters can be transferred to accelerator 520 as part of the request for resource configuration.

Pod manager 510 can provide requests for resource configuration in a first-in-first-out manner according to an order in which associated workload requests are received. In an embodiment, pod manager 510 may prioritize an order that requests for resource configuration are provided to accelerator 520. For example, pod manager 510 may prioritize which requests for resource configuration are provided to accelerator 520 based on associated workloads having the lowest required end-to-end latency, a repeat performance of a workload whose prior execution failed an SLA requirement, or other factors.

Various conditions or states can trigger pod manager 510 to request a resource configuration. As mentioned above, receipt of a workload request from a client device can trigger providing a request for a resource configuration to accelerator 520. For example, a hardware update or change such as an addition to or reduction from any compute resource can also trigger pod manager 510 to request an allocation for a suggested resource configuration. Also, changes in the software environment such as an update or change to a relevant software infrastructure can lead to a request for resource configuration.

An imminent change in a stage of a workload lifecycle can trigger pod manager 510 to request a resource configuration. Various workloads have lifecycles with different needs for different stages. For example, a database workload has a spike in network traffic and memory usage when data is ingested but network usage and memory usage drop off after data ingestion completes while processor usage increases but memory usage can remain steady. Pod manager 510 may monitor request application performance counters to determine appropriate workload requests for a stage in a workload lifecycle. For example, pod manager 510 may not require a full processor allocation for a database workload until network traffic usages are detected to lower. Pod manager 510 may make such resource requests independent from a workload request by a client or edge gateway. In some cases, pod manager 510 may apply a timer or use application performance counters to determine where a workload is in its lifecycle. Various telemetry techniques such as those described with respect to the collected daemon (described, for example, at https://collectd.org/) can be used to determine an application life stage. The lifecycle parameters of interest may include, for example, elapsed time of workload or application execution, processor or core utilization, memory utilization, storage utilization, network utilization, changes in boundedness, or changes in incoming or outgoing message rates by the application. Accordingly, pod manager 510 may send several resource configuration requests for a single workload request depending on a stage of the workload's lifecycle with a first resource configuration request for a startup phase and a second resource configuration request for a processing stage. A different suggested configuration can be applied depending on the life stage of the workload.

Changes to KPI, SLA, or QoS requirements may also trigger pod manager 510 to request resource allocations for affected applications or applications themselves may trigger workload requests in response to changes to KPI, SLA, or QoS requirements.

Accelerator 520 can receive resource configuration requests from pod manager 510 and provide the parameters (e.g., workload identifier, SLA requirement(s), required resource configuration or KPI, and so forth) of the request to resource determination module 522. Resource determination module 522 can determine whether any workload entry information is available from workload table 524 that is associated with the resource configuration request. Workload table 524 includes data relevant to a workload where at least some of the data is used to recommend a resource configuration for a workload. Table 1 provides an example of entries in table 524. Note that table 524 need not be stored as a table but can be stored in other formats such as a tree structure, collection of related tables, or a query-able database.

TABLE 1

| Workload ID | Accumulated Reward | Boundedness | Performance (e.g., end-to-end latency) | Current Resource Allocation |
|---|---|---|---|---|
| 0100010 | 5.0 | [compute: 0.6, storage: 0.4, . . . networking: 0.7] | 50 ms | [compute: 100 cores at 2 GHz, storage: 100 GB, . . . networking: 500 Mbps] |
| 1110100 | −0.2 | [compute: 0.8, storage: 0.7, . . . networking: 0.9] | 60 ms | [compute: 50 cores at 1.5 GHz, storage: 75 GB, . . . networking: 250 Mbps] |
| . . . | . . . | . . . | . . . | . . . |
| 0000101 | 0.0 | [compute: 0.7, storage: 0.5, . . . networking: 0.5] | 30 ms | [compute: 200 cores at 1.5 GHz, storage: 200 GB, . . . networking: 500 Mbps] |

For example, the following provides an example of information stored in each column.

Column Workload ID can identify a particular application that requested a workload or the application and the specified workload request parameters.

Column Accumulated Reward can track the accumulated reward for a particular workload ID based on historic rewards or penalties from applied or rejected resource configuration recommendations. Various examples are provided that show the accumulated reward values.

Column Boundedness can identify associated detected utilization of one or more of: processor, processor frequency, storage, memory, cache, or network interface.

Column Performance can provide the end-to-end latency measured from use of the most recently utilized resource configuration.

Column Current Resource Allocation can track the computing resources allocated and used by a workload in its most recent execution. For example, current resource allocation can track allocation to the workload of one or more of: processor compute, processor frequency, networking bandwidth, memory resources, or storage resources.

Table 524 can also include measurements of data center utilization and total cost of ownership arising out of use of a particular resource configuration for a workload. Other information can be stored in table 524 related to performance of a workload.

If a workload was not previously processed by accelerator 520 then accelerator 520 can create an entry in workload table 524 for the workload and suggest a resource configuration for the workload. For any subsequent executions of a workload, accelerator 520 updates table 524 to include information associated with the most recent execution of the workload.

Resource determination module 522 can use an AI model to process performance counters and understand how a workload is performing and how the workload performance evolves or devolves based on utilization of resources. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. The AI model can try to achieve performance requirements for the workload while also attempting to maximize utilization of resources and overall throughput of the edge computing system or data center to allow the edge computing system or data center to run as many workloads simultaneously as possible. Resource determination module 522 can provide a suggested resource allocation to pod manager 510.

Resource determination module 522 can start with use of an untrained AI model to allow the AI model to learn or the AI model can use a default configuration based on prior training or training from another pod manager or accelerator or specified by an administrator. Resource determination module 522 can use one or more AI or ML model for a single edge computing cluster. Resource determination module 522 can use an AI or ML model trained for each user or customer so that each customer can leverage an AI or ML model with potentially different training. Resource determination module 522 can use an AI or ML model dedicated to determining and suggesting resource allocations for particular categories of applications. For example, resource determination module 522 can use an AI or ML model for any workload request from any database category of applications, a separate AI or ML model for any workload request from a social networking category of applications, and a separate AI or ML model for any workload request from an image processing category of applications. For example, resource determination module 522 can use an AI or ML model for any workload request from a specific application, for example, an AI or ML model for each of application ABC_database or XYZ_social network. Resource determination module 522 can use an AI or ML model for a particular resource (e.g., compute, storage, memory, networking).

For a new workload request or a workload request that the accelerator 520 or pod manager 510 have been received before, table 524 will not have any data of any prior run, so table 524 will indicated to the resource determination module 522 that the workload is new by virtue of having no associated entry. The workload ID and an accumulated reward of zero can be recorded for the workload. Resource determination module 522 can make a resource configuration recommendation for the new workload and accelerator 520 can record any associated performance data or related information into table 524.

For a subsequent call for the same workload, the workload request data is fed to resource determination module 522. Resource determination module 522 progressively keeps learning and considers that the accumulated reward is currently zero and runs its model to determine a suggested resource configuration based at least on one or more of: boundedness, end-to-end latency, data center utilization, meeting or failing quality of service (QoS) requirements, conflicting requirements of other workloads executing simultaneously on at least portions of the same resources, and total cost of ownership (TCO). A suggested resource configuration can be one that is expected to meet or exceed performance requirements specified in the SLA and also provides a an acceptably low TCO or lowest TCO. Factors in deciding a TCO include cost of available equipment, age of available equipment, power use expected from a resource allocation, idleness of a computing resource, as well as other factors. For example, a low TCO can be one that uses older available equipment, has low power use, and uses idle computing resources.

In some examples, to accelerate training, pod manager 510 can provide simulated workload requests to resource determination module 522 for training. Pod manager 510 can reject or accept any resource allocations suggested by accelerator 520 even if not for an actual workload request and a reward/penalty feedback can be provided to train resource determination module 522. This training activity can take place while utilization of accelerator is considered low or can take place when requested.

Pod manager 510 can choose to accept or reject any suggested resource allocation. For example, if a workload is new, resource determination module 522 has not undergone a sufficient amount of training, SLA requirements are not met, or pod manager 510 knows performance will not be acceptable. For example, if a prior use of the suggested resource allocation yielded a failure to achieve performance requirements, then pod manager 510 can reject the suggested resource allocation. For a rejected suggestion, the pod manager 510 can request another suggestion from accelerator 520. In some examples, table 524 can store a record of whether the performance of the workload using the resource allocation was a success or failure and pod manager 510 can access table 524 to decide whether to accept or reject a suggested resource allocation.

While the workload is running and potentially after its completion, telemetry data is collected on one or a variety of nodes or monitoring point or points. Boundedness determination module 526 can receive telemetry inputs from a variety of sources including the application that requested the workload and other vantage points that can measure performance or system utilization from performance of that workload. For example, telemetry data can include measurements from Top-down Micro-Architecture Method (TMAM), system activity reporter (sar), Emon monitoring tool. However, a variety of monitoring tools can be used including but not limited to Iostat, Vtune, or monCli or other Intel Benchmark Install and Test Tool (Intel® BITT) Tools. Moreover, requirements of a virtual machine (VM), container, or compilers can be considered in determining boundedness. Boundedness determination module 526 can determine a boundedness for the workload. Boundedness can be expressed as a percentage or degree to which each computing resource is utilized (e.g., processor, memory, network, storage, and/or cache).

Telemetry collection and processing can occur out of band (OOB) such that application performance counters and measurement and telemetry data are routed directly to accelerator 520 and not through a compute stack such as use of a processor or OS of pod manager 510. For example, high speed and/or high bandwidth communication links may to route application performance counters and measurement and telemetry data to accelerator 520 without intermediate processing by any compute stack in any other computer except to route the data to accelerator 520. A high-speed wired or wireless connection (e.g., Ethernet or optical), bus, parallel or serial data link, or networking scheme can enable OOB transmission of application performance counters and measurement and telemetry data or other relevant information provided to accelerator 520.

In an example, telemetry collection and processing can occur in-band with other communications and be included with other communications or traffic sent to or received from pod manager 510 or accelerator 520.

Reward determination module 528 can determine a reward or penalty to provide for a suggested resource configuration in order to train resource determination module 522 based on one or more of: boundedness, end-to-end latency, data center utilization, meeting or failing performance requirements, or rejection of a resource configuration suggestion by pod manager 510. In some cases, a goal is to increase accumulated rewards and resource determination module 522 can choose resource allocation suggestions that increase the accumulated reward for a workload. In some cases, an accumulated reward level goal may be set and resource determination module 522 can choose resource recommendations so that the accumulated reward level goal is met for a workload.

A highest reward can be given for meeting SLA requirements and maximizing data center utilization. Maximizing data center utilization can be measured as the ability of the edge computing system (or cloud computing system, as the case may be) to handle other workloads or availability to handle other workloads. However, if SLA requirements are met but the data center dedicated too many computer resources to the workload, the reward may be less than a reward provided for an SLA requirement being met and the data center being able to handle more workloads. For multiple executions of the same workload, positive rewards can also be granted for: decreasing or steady end-to-end latency and/or decreasing or steady boundedness. For multiple executions of the same workload, lower rewards or penalties can be provided for: increasing end-to-end latency, increasing boundedness, or rejection of a resource configuration suggestion by pod manager 510. A lowest reward (e.g., zero or a negative award value penalty) can be given if the SLA requirements are not met, data center resources are overallocated to the workload, and performance of the workload is worse than that of a prior run.

Note that multiple instantiations of any portion of the system of FIG. 5 can be used to determine a resource configuration for a workload. For example, if the system experiences higher than normal workload requests or a latency between providing a workload request and receiving a suggested resource configuration is at or beyond a threshold time limit, more instantiations of accelerator 520 can be made to provide faster resource configuration suggestions for workload requests. Multiple neural networks, processor cores, or graphics processing units can be made available for use by AI or ML models.

Figure 6:
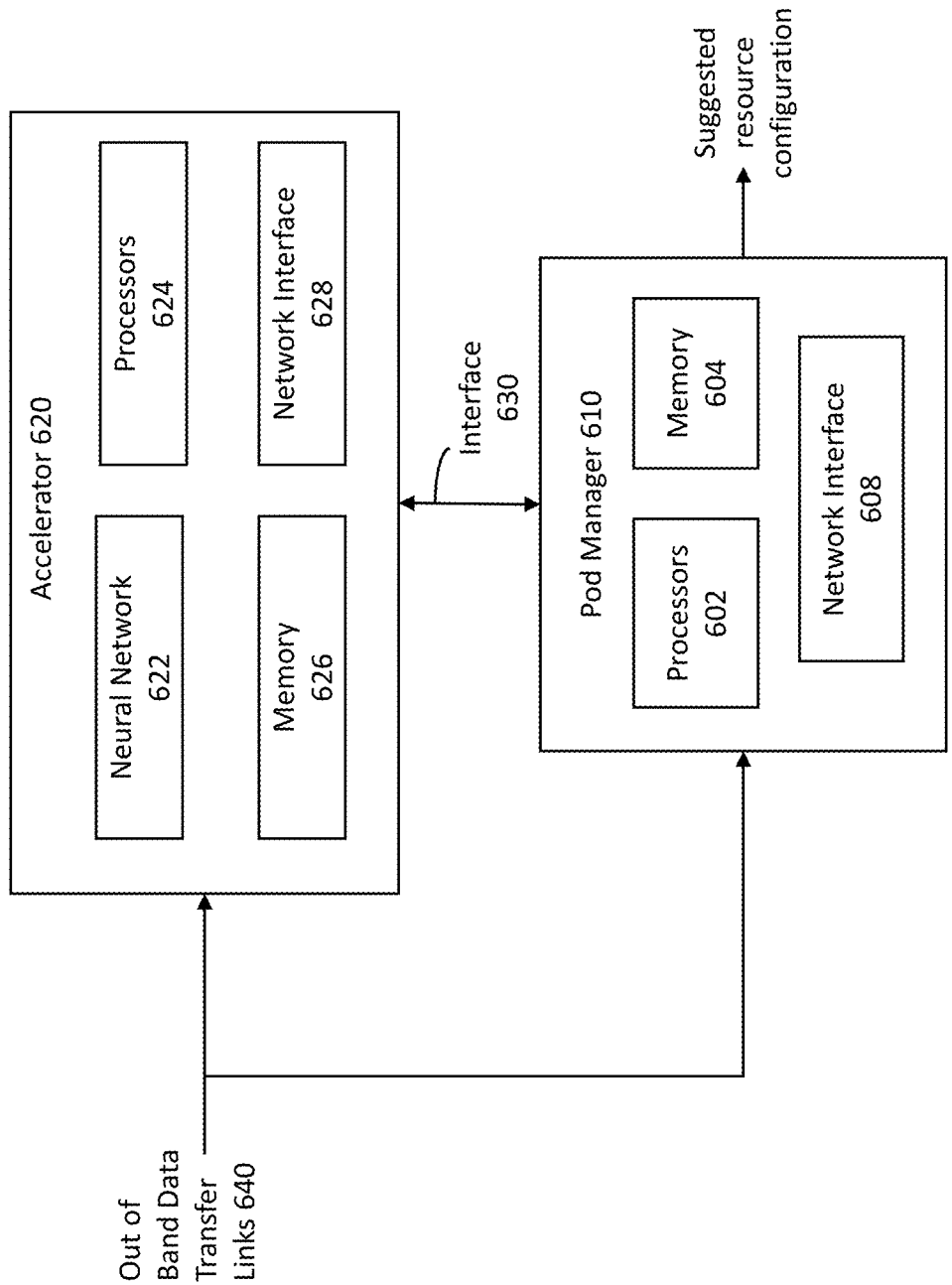
FIG. 6 provides an example of components, in accordance with an embodiment.

FIG. 6 provides an example, in block diagram form, of components that can be used by pod manager 610 and accelerator 620. Pod manager 610 can use processors 602, memory 604, and network interface 608. Accelerator 620 can use a neural network 622, processors 624, memory 626, and network interface 628. Pod manager 610 and accelerator 620 can communicate using interface 630 and receive out of band (OOB) information via links 640.

Processors 602 and 624 can include a single or multi-core processor, graphics processing unit, logical execution unit single or multi-level cache, functional units usable to independently execute programs or threads, application specific integrated circuits (ASICs), neural network processors (NNPs), and programmable processing elements such as field programmable gate arrays (FPGAs). Neural network 622 can be embodied as a separate neural network device use any components of processors 624. Neural network 622 can receive inputs related to workload performance such as telemetry data, performance data, boundedness, accumulated reward, configured resources and provide a variety of outputs that can be candidate suggestions for suggested resource configuration.

Memory 604 and 626 may include non-volatile and/or volatile types of memory. Non-volatile types of memory may be types of memory whose state is determinate even if power is interrupted to the device. Non-volatile types of memory can include any or a combination of: 3D Crosspoint memory (3DxP), or other byte addressable non-volatile memory, memory devices that use chalcogenide phase change material (e.g., chalcogenide glass), multi-threshold level NAND flash memory, NOR flash memory, single or multi-level phase change memory (PCM), a resistive memory, nanowire memory, ferroelectric transistor random access memory (FeTRAM), magneto resistive random access memory (MRAM) memory that incorporates memristor technology, or spin transfer torque MRAM (STT-MRAM), or a combination of any of the above, or other memory types. Volatile types of memory may include any or a combination of random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM).

Interface 630 can be any interface that allows device-to-device communication, including a bus, a parallel bi-directional or un-directional link, or utilize any networking standard such as Ethernet to communicate. For example, network interfaces 608 and 628 can manage communications use interface 630. Network interfaces 608 and 628 can also provide communication between external devices such as an edge gateway, edge computing system or data center. Network interfaces 608 and 628 can provide communications using wireless or wired communication technologies and associated protocols, e.g., Internet Protocol (IP), Ethernet, Bluetooth®, Wi-Fi®, 3GPP LTE, 5G, Fibre Channel, or InfiniBand communication protocols.

Out of band data transfer links 640 can provide out of band transfer of telemetry data and workload performance measurements to pod manager 610 and accelerator 620. Out of band data transfer links 640 can provide such data and measurements independent from use of a networking or other connection between pod manager 610 and accelerator 620 and pod manager 610 and any edge or cloud computing gateway or resource cluster.

Figure 7:
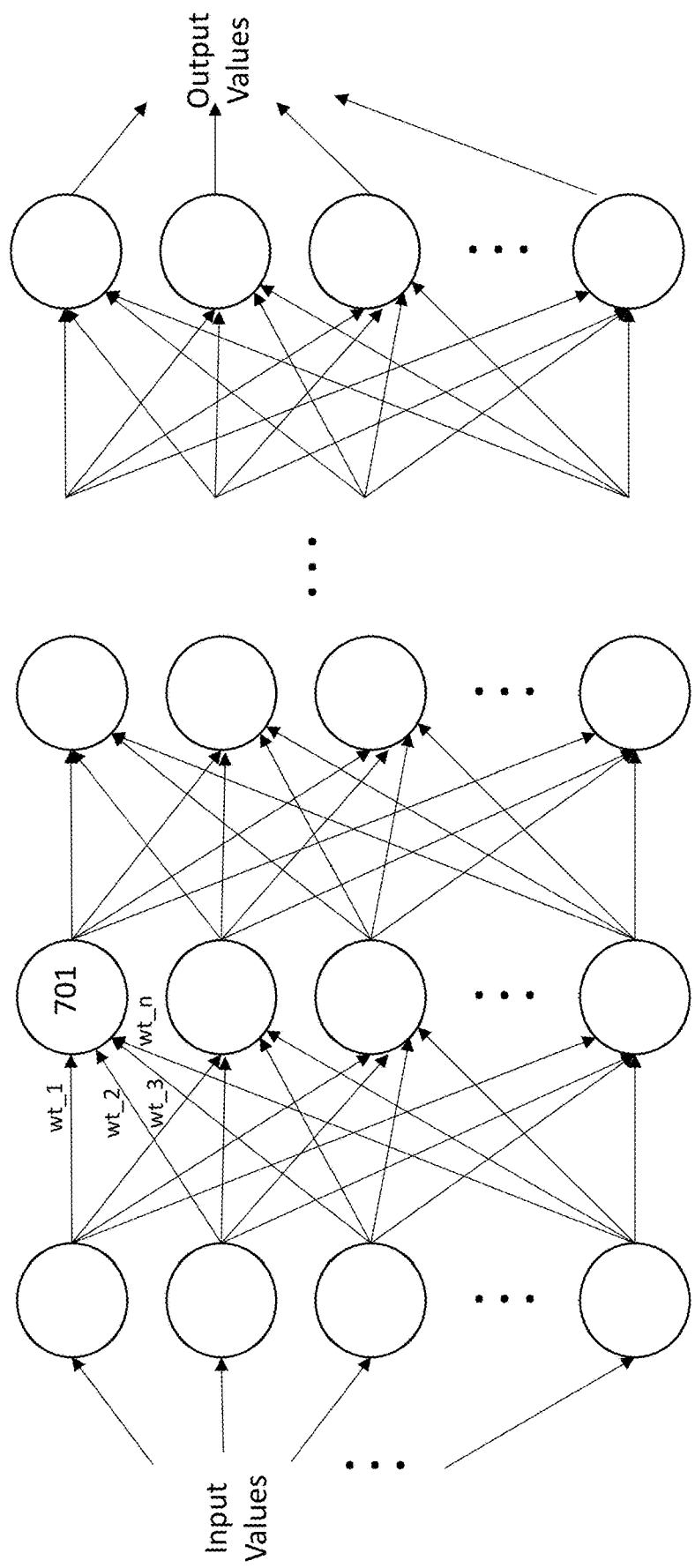
FIG. 7 provides an example of a neural network, in accordance with an embodiment.

FIG. 7 provides an example of a neural network. A neural network can be implemented using any or a combination of: one or more hardware components or as program code instructions that are executed on one or more central processing unit (CPU) or cores or graphics processing unit (GPU) processing cores. Inner layers of a neural network can be viewed as layers of neurons that each receive weighted outputs from the neurons of other (e.g., preceding)

layer(s) of neurons in a mesh-like interconnection structure between layers. The weight of the connection from the output of a particular preceding neuron to the input of another subsequent neuron is set according to the influence or effect that the preceding neuron is to have on the subsequent neuron (for ease of drawing only one neuron 701 and the weights of input connections are labeled). Here, the output value of the preceding neuron is multiplied by the weight of its connection to the subsequent neuron to determine the particular stimulus that the preceding neuron presents to the subsequent neuron.

A neuron's total input stimulus corresponds to the combined stimulation of all of its weighted input connections. According to various implementations, if a neuron's total input stimulus exceeds some threshold, the neuron is triggered to perform some, e.g., linear or non-linear mathematical function on its input stimulus. The output of the mathematical function corresponds to the output of the neuron which is subsequently multiplied by the respective weights of the neuron's output connections to its following neurons.

Notably, generally, the more connections between neurons, the more neurons per layer and/or the more layers of neurons, the greater the intelligence the network is capable of achieving. As such, neural networks for actual, real-world artificial intelligence applications can use large numbers of neurons and large numbers of connections between neurons.

Figure 8:
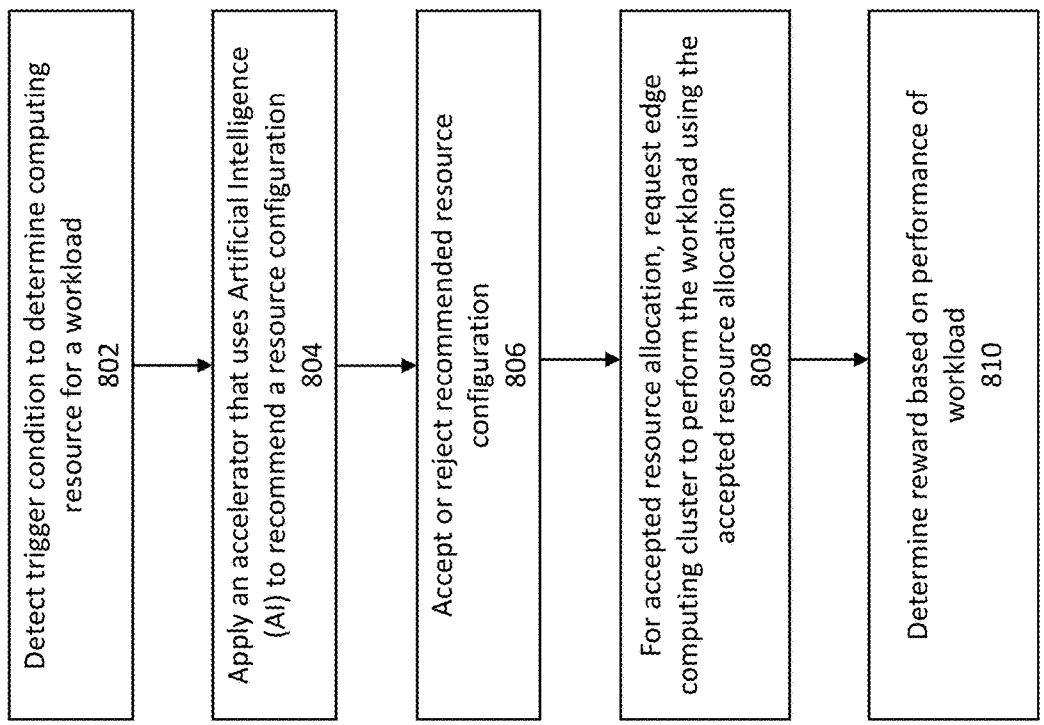
FIG. 8 illustrates a process to determine a resource configuration, in accordance with an embodiment.

FIG. 8 illustrates a process 800 to determine a resource configuration to apply for a workload. The process can be applied to provide computer resource allocation for client devices that request computing resources from an edge computing resource that is physically proximate to client devices or a gateway in wired or wireless communication with the client devices. At 802, detection of a trigger condition for a resource configuration can occur. For example, a workload request from an edge gateway or client device can trigger a request for a resource configuration. Other examples that could trigger a resource configuration request include an update to any hardware or software used by the edge computing cluster, a change in SLA or QoS requirements, or an imminent change in life stage of an application or process.

At 804, there is use of an accelerator that leverages an AI model to determine a resource allocation for a workload. The AI model can be any or a combination of: reinforcement learning scheme, Q-learning scheme, deep-Q learning, or Asynchronous Advantage Actor-Critic (A3C), combinatorial neural network, recurrent combinatorial neural network, or other AI or ML model. The AI model can attempt to maximize total accumulated reward arising from rewards/penalties feedback from use of each recommendation of a resource allocation for a workload. The AI model can determine a recommendation of a resource configuration that leads to meeting or exceeding performance requirements specified in the SLA and also provides an acceptably low TCO or lowest TCO. TCO can be related to equipment expense or age, power use expected from a resource allocation, current availability of computing resources from not being used by other workloads, as well as other factors.

At 806, the recommended resource allocation is accepted or rejected. A resource recommendation can be accepted if it is known to comply with SLA or other performance requirements. A resource recommendation can be rejected if the AI model is too early in its training or learning phase after it was first used or known to not yield performance that meets or exceeds SLA or other performance requirements.

At 808, a request is provided to the edge computing cluster (or other computing resource) to perform the workload using the accepted resource allocation. At 810, a reward or penalty is determined based on measured performance of the workload by the allocated computing resources as well as data center utilization. The reward or penalty can be added to the accumulated reward tracked for the current workload. The reward or penalty can be based on one or more of: boundedness, end-to-end latency, data center utilization, meeting or failing performance requirements, or rejection of a resource configuration suggestion. The determined boundedness can be a utilization by one or more of: processor compute, networking, memory, or storage resources. End-to-end latency can be the determined time between a workload request and completion of the request by provision of a result or results from the request. A reward value can be positive for satisfaction of the SLA requirement(s) and one or more of: lower data center utilization by the workload (e.g., higher capacity to handle other workloads), satisfaction of performance requirements, steadiness or reduction in end-to-end latency, and/or steadiness or reduction in boundedness. A reward value can be lower (or negative) for one or more of: failure to meet requirements of the SLA, failure to meet performance requirement(s), higher data center utilization by the workload (e.g., higher capacity to handle other workloads), an increase in end-to-end latency, and/or an increase in boundedness.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. A method comprising:
   determining, at a manager of computing resources in one or more racks, whether to allocate computing resources for a workload, wherein the workload is performed for a client device;
   requesting, by the manager of computing resources in one or more racks, a recommendation of a computing resource allocation; and
   applying an artificial intelligence (AI) model, using an accelerator device, to determine the recommendation of the computing resource allocation for the workload, the model to determine the computing resource allocation based at least, in part, on measured performance associated with one or more prior performances of at least a portion of the workload;
   receiving, at the accelerator device, telemetry data using out of band (OOB) channels, the telemetry data arising out of the performance of the workload; and
   determining at least one performance indicator associated with performance of the workload based at least, in part, on the received telemetry data.

2. The method of claim 1, wherein the determining, at the manager of computing resources in one or more racks, whether to allocate computing resources for a workload comprises determining whether to allocate computing resources for a workload based at least in part on one or more of: receipt of one or more of a workload request from a network gateway or client device, an update to hardware or software used by the computing resources, a change in service level agreement (SLA) or quality of service (QoS) requirements, or an imminent change in life stage of an application or process.

3. The method of claim 1, wherein the applying an artificial intelligence (AI) model, using an accelerator, comprises using any or a combination of: a reinforcement learning model, a Q-learning model, a deep-Q learning model, an Asynchronous Advantage Actor-Critic (A3C) model, combinatorial neural network, or recurrent combinatorial neural network.

4. The method of claim 1, comprising:
   determining whether to accept the recommendation of the computing resource allocation, wherein the determining whether to accept the recommendation of the computing resource allocation is based at least, in part, on one or more of: utilize the recommendation of the computing resource allocation will not yield compliance with a service level agreement (SLA) or the AI model is early in its training phase.

5. The method of claim 1, wherein determining at least one performance indicator associated with performance of the workload is based at least, in part, on the received telemetry data in response to a determination to accept the recommendation of the computing resource allocation and comprising:
   in response to the determination to accept the recommendation of the computing resource allocation:
      causing at least a portion of the computing resources to perform the workload using the recommendation of the computing resource allocation,
      providing a reward based at least, in part, on the at least one performance indicator, wherein providing a reward based at least, in part, on the at least one performance indicator comprises providing a reward based at least, in part, on one or more of: boundedness, end-to-end latency, computing resource utilization, meeting or failing performance requirements, meeting or failing quality of service (QoS) requirements, conflicting requirements of other workloads executing simultaneously on at least portions of the computing resources, or rejection of a resource configuration suggestion.

6. The method of claim 1, further comprising:
storing information related to a performance of the workload, wherein the information comprises one or more of: a workload identifier, accumulated reward, boundedness measurement, performance measurement, and resource allocation.

7. The method of claim 1, further comprising:
receiving, by the manager of computing resources in one or more racks, a request to perform a second workload;
determining, by the manager of computing resources in one or more racks, whether at least a portion of the second workload has been performed before using the computing resources;
requesting, by the manager of computing resources in one or more racks, a recommendation of a second computing resource allocation;
determining whether the second workload is substantially the same as the workload; and
in response to a determination that the second workload is substantially the same as the workload:
applying the AI model to determine the recommendation of the second computing resource allocation for the second workload, the AI model to determine the second computing resource allocation based at least, in part, on measured performance associated with the second workload;
causing the computing resources to perform the second workload using the recommendation of the second computing resource allocation;
determining at least one performance indicator associated with the performance of the second workload; and
providing a second reward for the second workload based at least, in part, on the at least one performance indicator, wherein:
the at least one performance indicator is based at least, in part, on one or more of: boundedness, end-to-end latency, computing resource utilization, meeting or failing performance requirements, or rejection of a resource configuration suggestion; and
accumulating the second reward with an accumulated award for the workload.

8. An apparatus comprising:
a resource manager of computing resources in one or more racks and
an interface capable to communicatively couple with the computing resources when connected with the computing resources, wherein the manager of computing resources comprises:
at least one processor and
at least one memory communicatively coupled to the at least one processor, wherein the at least one processor is to:
identify a resource allocation scenario for a workload A;
apply an artificial intelligence (AI) model to determine a resource allocation recommendation for the workload A, the AI model trained based on rewards arising out of resource allocation recommendations made for one or more workloads that are substantially similar to workload A;
determine whether to accept the resource allocation recommendation for the workload A; and
in response to a determination to accept the resource allocation recommendation:
cause the computing resources, when coupled to the interface, to apply the resource allocation recommendation to perform workload A; and
a second interface to receive telemetry data, the telemetry data arising out of a performance of the workload A by the computing resources, wherein the at least one processor is to determine at least one of boundedness and end-to-end latency associated with the performance of the workload is based at least, in part, on the telemetry data.

9. The apparatus of claim 8, wherein to identify a resource allocation scenario for a workload A, the at least one processor is to identify one or more of: receipt of one or more of a workload request from a client device, an update to hardware or software used by the computing resources, a change in service level agreement (SLA) or quality of service (QoS) requirements, or an imminent change in life stage of an application or process.

10. The apparatus of claim 8, wherein the AI model comprises any or a combination of: a reinforcement learning model, a Q-learning model, a deep-Q learning model, or an Asynchronous Advantage Actor-Critic (A3C) model, combinatorial neural network, or recurrent combinatorial neural network.

11. The apparatus of claim 8, comprising a neural network and a graphics processing unit both communicatively coupled to at least one processor, wherein the AI model is to utilize one or more of: the at least one processor, neural network, and the graphics processing unit.

12. The apparatus of claim 8, wherein to determine whether to accept the resource allocation recommendation for the workload A is based at least, in part, on a determination of one or more of: utilization of the resource allocation recommendation will not yield compliance with a service level agreement (SLA) or that the AI model is early in its training phase.

13. The apparatus of claim 8, wherein the at least one processor is to
determine a reward associated with the resource allocation recommendation for workload A to be provided to the AI model based at least, in part, on one or more of: boundedness, end-to-end latency, computing resource utilization, meeting or failing performance requirements, or rejection of a resource configuration suggestion.

14. The apparatus of claim 8, wherein the at least one processor is to:
store information related to performance of the workload A, wherein the information comprises one or more of: a workload identifier, accumulated reward, boundedness measurement, performance measurement, and resource allocation.

15. The apparatus of claim 8, further comprising:
the computing resources, wherein the computing resources comprises at least one computing device and the computing resources are communicatively coupled to the interface.

16. The apparatus of claim 8, wherein the at least one processor is to:

identify a resource allocation scenario for a workload B;
determine whether workload B is substantially similar to workload A and also is to utilize at least a portion of the computing resources;
in response to a determination that the workload B is substantially the same as the workload A:
　apply the AI model to determine a resource allocation recommendation for the workload B;
　determine whether to accept the resource allocation recommendation for the workload B;
　in response to a determination to accept the resource allocation recommendation:
　　cause the computing resources to utilize the resource allocation recommendation to perform workload B;
　　determine a second reward associated with the resource allocation recommendation for workload B to be provided to the AI model, the second reward based at least, in part, on one or more of: boundedness, end-to-end latency, computing resource utilization, meeting or failing performance requirements, or rejection of a resource configuration suggestion; and
　　store the second reward with an accumulated reward for workload A.

17. A non-transitory computer-readable medium comprising instructions, that if executed by one or more machines, cause the one or more machines to:
identify a resource allocation scenario for a workload A;
apply an artificial intelligence (AI) model to determine a resource allocation recommendation for the workload A, the AI model trained based on rewards arising out of resource allocation recommendations made for one or more workloads that are substantially similar to workload A;
determine whether to accept the resource allocation recommendation for the workload A; and
in response to a determination to accept the resource allocation recommendation:
　cause, by a manager of computing resources in one or more racks, the computing resources to apply the resource allocation recommendation to perform workload A and
　receive telemetry data using out of band (OOB) channels, the telemetry data arising out of the performance of the workload A; and
　determine at least one performance indicator associated with performance of the workload A based at least, in part, on the received telemetry data.

18. The medium of claim 17, wherein to identify a resource allocation scenario for a workload A, the one or more machines are to identify one or more of: receipt of one or more of a workload request from a client device, an update to hardware or software used by the computing resources, a change in service level agreement (SLA) or quality of service (QoS) requirements, or an imminent change in life stage of an application or process.

* * * * *

UNITED STATES PATENT AND TRADEMARK OFFICE
CERTIFICATE OF CORRECTION

PATENT NO. : 11,507,430 B2
APPLICATION NO. : 16/144962
DATED : November 22, 2022
INVENTOR(S) : Rasika Subramanian, Francesc Guim Bernat and David J. Zimmerman It is certified that error appears in the above-identified patent and that said Letters Patent is hereby corrected as shown below:

In the Claims

Column 16 Line 65 Claim 5 change:
"using the recommendation of the computing resource allocation, providing a reward"
To:
using the recommendation of the computing resource allocation, and providing a reward Signed and Sealed this
Twenty-fourth Day of January, 2023

Katherine Kelly Vidal
*Director of the United States Patent and Trademark Office*